F. G. DENTON AND M. ANGUS.
PACKING FOR GLANDS, STUFFING BOXES, AND THE LIKE.
APPLICATION FILED FEB. 27, 1922.
1,421,356.  Patented June 27, 1922.
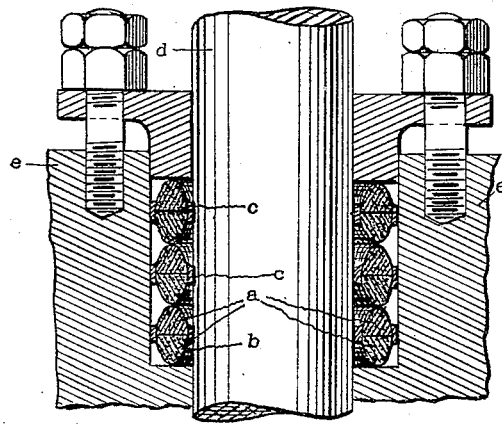
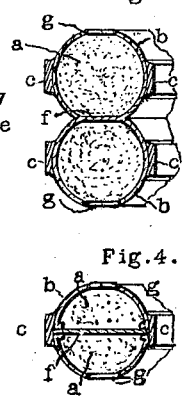
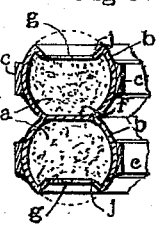
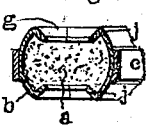
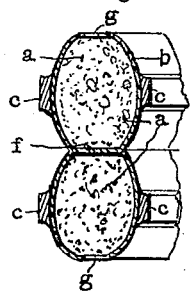
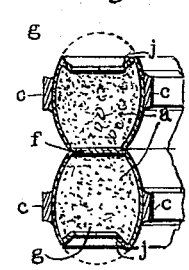
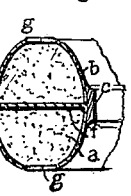
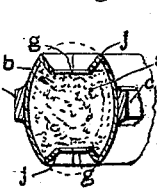
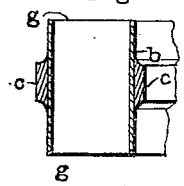
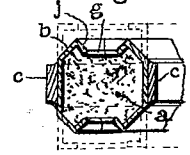
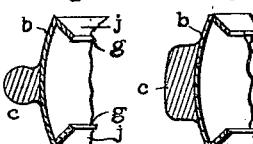
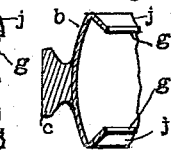
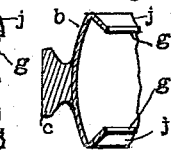
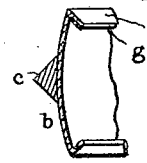
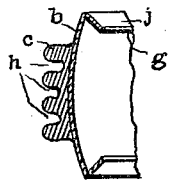
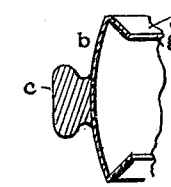
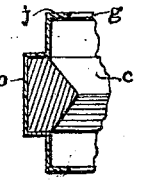
Inventors
Frederick George Denton &
Matthew Angus,
By
Attorney.

UNITED STATES PATENT OFFICE.

FREDERICK GEORGE DENTON AND MATTHEW ANGUS, OF LOW FELL, GATESHEAD, ENGLAND.

PACKING FOR GLANDS, STUFFING BOXES, AND THE LIKE.

1,421,356.  Specification of Letters Patent.  Patented June 27, 1922.

Application filed February 27, 1922. Serial No. 539,635.

*To all whom it may concern:*

Be it known that we, FREDERICK GEORGE DENTON and MATTHEW ANGUS, subjects of the King of Great Britain and Ireland, of 21 Albert Drive, Low Fell, Gateshead, and 8 Beacon Street, Low Fell, Gateshead, in the county of Durham, England, respectively, have invented an Improved Packing for Glands, Stuffing Boxes, and the like, of which the following is a specification.

This invention relates to an improved packing for glands, stuffing boxes and the like of the type known as semi-metallic, in which metal is employed for contact with the working surfaces in combination with some filling material such as asbestos or canvas for giving resiliency to the casing or shell of the packing. In this type of packing the metal is usually in the form of a casing or shell which encloses the resilient filling material as asbestos or canvas.

According to the present invention, the shell or casing, which is preferably produced in the course of manufacture as a continuous pipe, and may be in one or more parts, is provided with projections of suitable form which constitute the actual bearing surfaces and in a modification, opposite sides of the shell may be connected by a partition, septum or diaphragm, or a unit may be formed of two such shells separated by a wall, partition, septum or diaphragm. We thus secure the advantages of metallic bearing surfaces with small frictional losses, and resilience and flexibility of the packing in use.

The accompanying drawings illustrate forms of the invention.

Figure 1 is a cross sectional view of a gland or stuffing box provided with the improved packing.

Fig. 2 is a transverse section of a packing ring having two chambers for separate fillings.

Fig. 3 is a similar view of a like structure in which the open ends are bent inward to retain fillings within the chambers.

Fig. 4 is a sectional view of a modified form in which two concavo-convex shells maintain between them a septum.

Fig. 5 is a section of a ring with the ends bent inward to retain the filling.

Figs. 6 and 7 are views showing oval chambers each having central septums and pairs of external rings.

Fig. 8 shows a casing of oval formation with a central septum.

Fig. 9 is a section of oval formation with inturned edges.

Fig. 10 is a section of a form having straight side walls.

Fig. 11 is a view showing a modification developed from Fig. 10.

Figs. 12 to 17 inclusive are views showing modifications, as to shape of the packing rings which are attached to the shells, and Fig. 18 shows a modified form in which the rings are positioned within the casing.

The same reference letters on various figures refer to the same or similar parts.

In Figure 1 three rings or coils of packing are shown the section of which corresponds with that shown in Figure 8. The resilient inner packing $a$ which may be of canvas or asbestos is contained within a metallic shell $b$ which is provided on opposite sides with solid annular projections $c$ which contact respectively with the rod $d$ and the wall of the box $e$. In Figure 8 the shell is of oval or elliptical form with the major axis vertical but it may be circular as in Figure 4, or cylindrical as in Figure 10 or any other suitable shape. In some forms as in Figures 2, 3, 4, 6, 7 and 8 a unit may be formed of two circular or oval shells separated by a wall, partition, septum or diaphragm $f$ and all the forms described may be provided with apertures $g$ at top and bottom through which the inner packing or filling may protrude slightly. The sides of the shell or casing (other than the bearing surfaces $c$) may be perforated if desired.

Although not so shown, it will of course, be understood that the wall, partition, septum or diaphragm $f$ might be provided across the centre of such forms of the shell.

In the several forms shell $b$ about the opening $g$, will be turned inwards to form lips $j$ which act as keys or retaining elements for the filling.

In Figures 12 to 18 are shown various forms of the bearing surfaces $c$. Figure 16 shows a form in which a plurality of bearing surfaces are separated by recesses or grooves $h$. These might be employed for retaining lubricant.

In most cases in practice we prefer to use a lead alloy for the material of the pipe or shell, but in the case of a filling or packing which will come into contact with superheated steam, the melting-point of the base of the alloy may require to be considered and the lead may then be replaced by a more suitable base.

We do not therefore wish to be confined to the special alloy mentioned, and in fact a pure metal casing may be employed if the metal is secured sufficiently thin. In the latter case, the pipe or shell would be cold-drawn, while in the course of manufacture from the alloy we prefer to use the ordinary well-known extrusion process or else a casting process.

The shell or casing may be provided in one or more parts as desired.

The improved packing may be inserted into the gland or stuffing box in a continuous length that is, in spiral form or in rings cut off from the length as may be desired.

We claim:—

1. A packing for the purpose set forth, comprising a metallic shell having convex side walls which carry between the ends thereof bearing surfaces which project from opposite side walls of the shell, said shell having end openings with inward extending marginal portions, and a filling for the shells which is engaged by the inward extending marginal portions of the shell.

2. A packing ring, comprising a compressible cylindrical casing, a filling located within the interior of the casing, and oppositely disposed inward extending projections on opposite end portions of the casing for the retention of the filling.

3. A packing for glands, stuffing boxes and the like, comprising an open ended metallic shell with curved sides and with inward projecting portions about said openings, a resilient filling material which is housed within the shell, and is engaged by the inward projecting portions of the shell to retain therein the filling.

4. A packing for the purpose set forth, comprising a hollow body separated by a partition to provide separated chambers, a filling for said chambers, and opposite bearing surfaces for the chambers.

5. A packing for the purpose set forth, comprising a metallic shell, having convex walls and an intermediate transverse partition forming chambers, the ends of the shell being open and provided with circumferential inturned rims, a packing within the shell and oppositely disposed inner and outer projections for each of the chambers.

FREDERICK GEORGE DENTON.
MATTHEW ANGUS.